(12) United States Patent
Regan

(10) Patent No.: US 7,935,915 B2
(45) Date of Patent: *May 3, 2011

(54) INDUCTION HEATING APPARATUS FOR HEAT TREATING A SECTION OF PIPE

(76) Inventor: Colin A. Regan, Wabamum (CA)

(*) Notice: Subject to any disclaimer, the term of this patent is extended or adjusted under 35 U.S.C. 154(b) by 726 days.

This patent is subject to a terminal disclaimer.

(21) Appl. No.: 11/773,559

(22) Filed: Jul. 5, 2007

(65) Prior Publication Data
US 2008/0105671 A1    May 8, 2008

Related U.S. Application Data

(63) Continuation-in-part of application No. 10/709,595, filed on May 17, 2004, now Pat. No. 7,256,374.

(51) Int. Cl.
*H05B 6/10*    (2006.01)

(52) U.S. Cl. ................................ 219/643; 219/635
(58) Field of Classification Search .............. 219/643, 219/204, 642, 637, 59.1, 607
See application file for complete search history.

(56) References Cited

U.S. PATENT DOCUMENTS
7,256,374 B2 * 8/2007 Regan ........................ 219/607
* cited by examiner

*Primary Examiner* — Daniel Robinson
(74) *Attorney, Agent, or Firm* — William J. Bundren; J. Jay Haugen

(57) ABSTRACT

A heating apparatus for heating a pipe prior to performing a welding operation, an interpass welding operation, or a hydrogen bake-out operation is provided. The heating apparatus comprises at least one heating collar placed on one side of a pipe weld joint and a control mechanism for controlling the thermal energy transferred from the heating apparatus to the pipe.

16 Claims, 14 Drawing Sheets

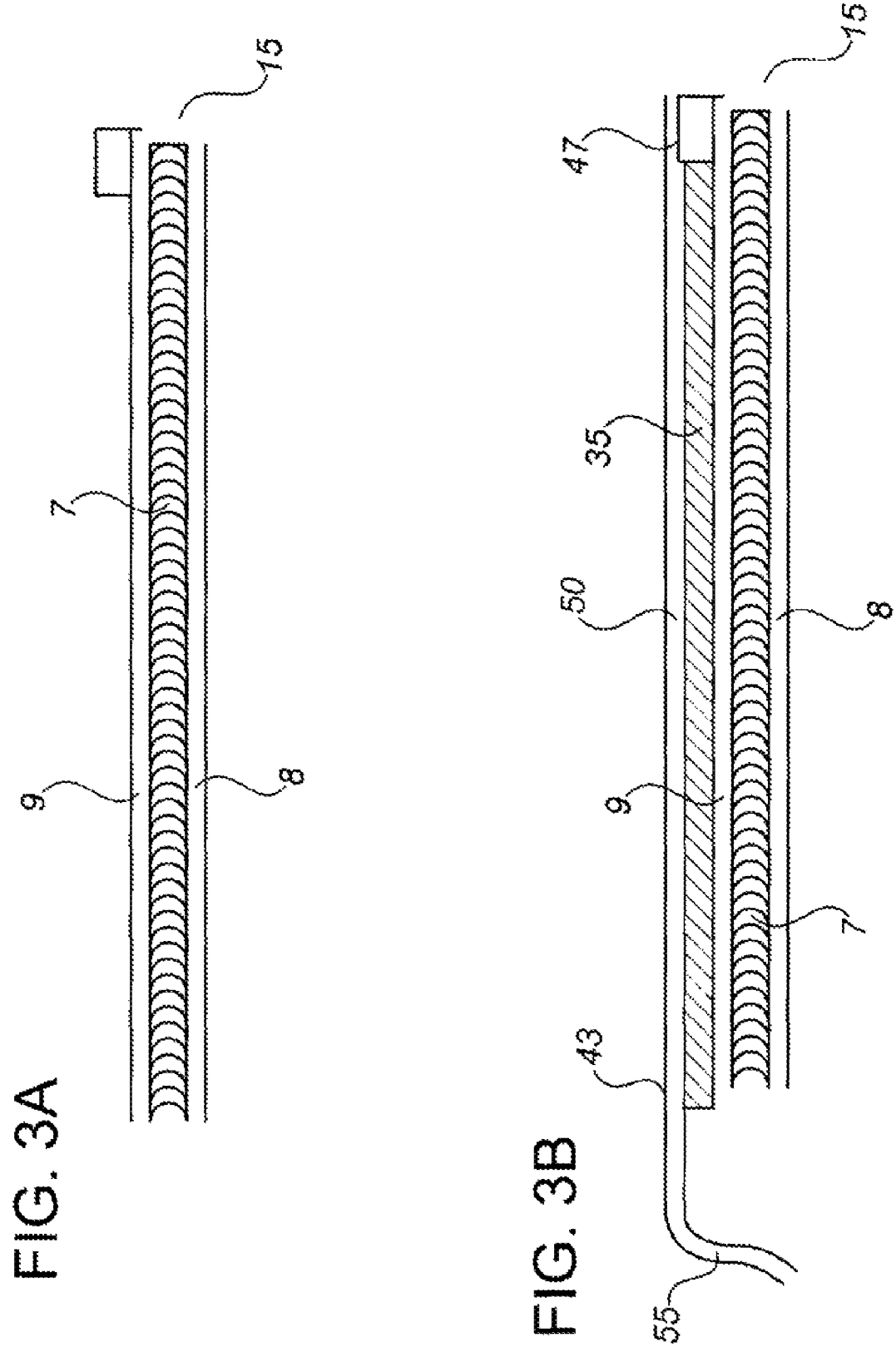

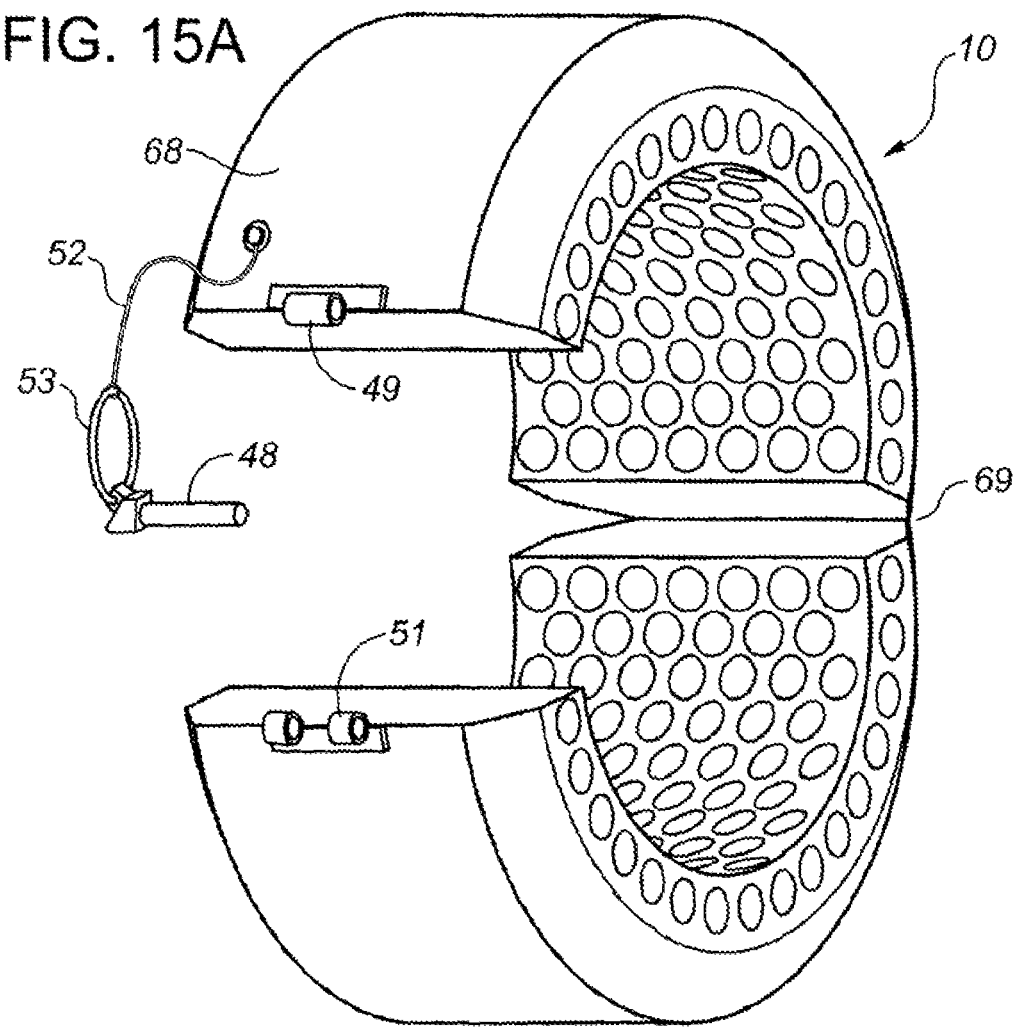
FIG. 15A
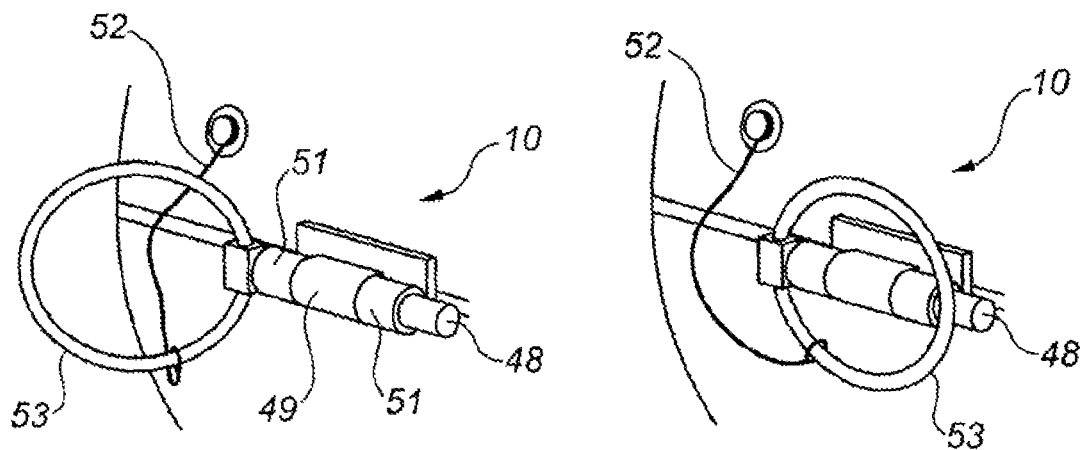
FIG. 15B
FIG. 15C

INDUCTION HEATING APPARATUS FOR HEAT TREATING A SECTION OF PIPE

TECHNICAL FIELD

The present invention relates to a heating device for pre-heating sections of piping before performing a welding operation an interpass welding operation, or a hydrogen bake-out of the weld. In particular, the present invention relates to heating collars placed on each pipe adjacent to the weld joint.

BACKGROUND OF THE INVENTION

Many of the prior art inventions for heating pipe are difficult and cumbersome to apply, remove or relocate from the weld area that is typically located within a tightly confined area. Additionally, many of the prior art inventions require a power source requiring the use of heavy machinery to provide a suitable source of power. For example, a generator truck is typically required for voltage requirements exceeding 240 volts. Each truck uses heavy cabling to supply power from the generator mounted on the truck to the heating apparatus, which is typically located in a remote location from the weld site. The heavy cabling may present a hazard at the work site since the use of heavy voltage cabling present a safety hazard.

It is, therefore, desirable, to provide a portable heating apparatus for heat treating a section of pipe. The system and apparatus are easy to use and do not pose a worksite safety hazard.

SUMMARY OF THE INVENTION

A heating device is provided for pre-heating one or more sections of pipe or piping prior to welding the pipe sections together, for heating a weld joint prior to performing an interpass welding operation, and/or for heating a weld joint to perform a hydrogen bake-out operation. In preferred embodiments of the invention, the apparatus is portable.

In one embodiment, the heating device can comprise a collar that can be releasably attached to a pipe. The device can comprise electric heating elements disposed within the collar. In a further embodiment, the device can comprise a thermostat control to provide means to heat a pipe to a desired temperature.

Broadly stated, a heating apparatus for heating a section of metal piping is provided, the heating apparatus comprising: at least one, preferably a pair, of opposed heating collars spaced substantially parallel and contiguous with a weld joint, each heating collar comprising a resistance wire network that is capable of creating a thermal resistance through the network when voltage is applied across the wire; and a voltage controller.

BRIEF DESCRIPTION OF THE DRAWINGS

FIG. 3A is a cross-sectional view depicting a heating collar including the heating apparatus of FIG. 1.

FIG. 3B is a cross-sectional view depicting the heating collar of FIG. 3A with fastening means.

FIG. 15A is a perspective view depicting the heating collar of FIG. 12 in an open position and having a lynch pin fastening mechanism.

FIG. 15B is a perspective view depicting the heating collar of FIG. 15S with the lynch pin inserted.

FIG. 15C is a perspective view depicting the heating collar of FIG. 15A with the lynch pin fully inserted.

DETAILED DESCRIPTION OF EMBODIMENTS

The present invention is a system for heating a section of pipe comprising at least one heating collar, said heat collar comprising a source of heat; an inner layer communicating with said source of heat and configured to transfer heat from said source of heat to said pipe; an outer layer communicating with said inner layer and configured to protect or shield an external environment from said source of heat; and a voltage controller. In preferred embodiments of the invention, the system and apparatus are portable.

In some embodiments of the invention, the heating collar includes an inner layer for absorbing heat from the source of heat and distributing or transferring it to the pipe.

In some embodiments of the invention, the heating collar includes at least one outer layer that insulates or protects the outside of the heating collar from the source of heat.

In some embodiments of the invention, the heating collar includes a voltage controller or regulator, preferably for adjusting and/or changing and/or modulating the amount of heat or the period of heating.

In some embodiments of the invention, the heating collar includes one or more closures or fasteners, preferably one or more releasable or openable closures.

The present invention also involves a heating apparatus comprising a heat collar as described above.

The present invention also includes a method for heating a section of pipe comprising contacting a portion of a pipe, typically an end, with at least one heating collar as described above, and heating the pipe using the heating collar.

In some embodiments of the invention, the method may also include pre-heating the pipe.

In some embodiments of the invention, the method may also include welding a portion of the pipe. In some embodiments of the invention, the method may further include a finishing process on said weld using the heating collar as described above. In these embodiments of the invention, finishing refers to removing or reducing impurities from the weld.

Exemplary systems, heating apparatuses, and methods may be evident by reference to the system and apparatuses shown in the figures. A system for heating a section of pipe is generally denoted as 1. The system 1 may be variously configured. In accordance with the present invention, the system may include one or more heating collars; one or more sources of heat or heating elements; one or more heat transfer layers, e.g., an inner layer; one or more heat protective layers, e.g., an outer layer; one or more heat regulators, e.g., voltage regulators; and, optionally, one or more closures.

Each of the elements is described in more detail below.

Figure 4:
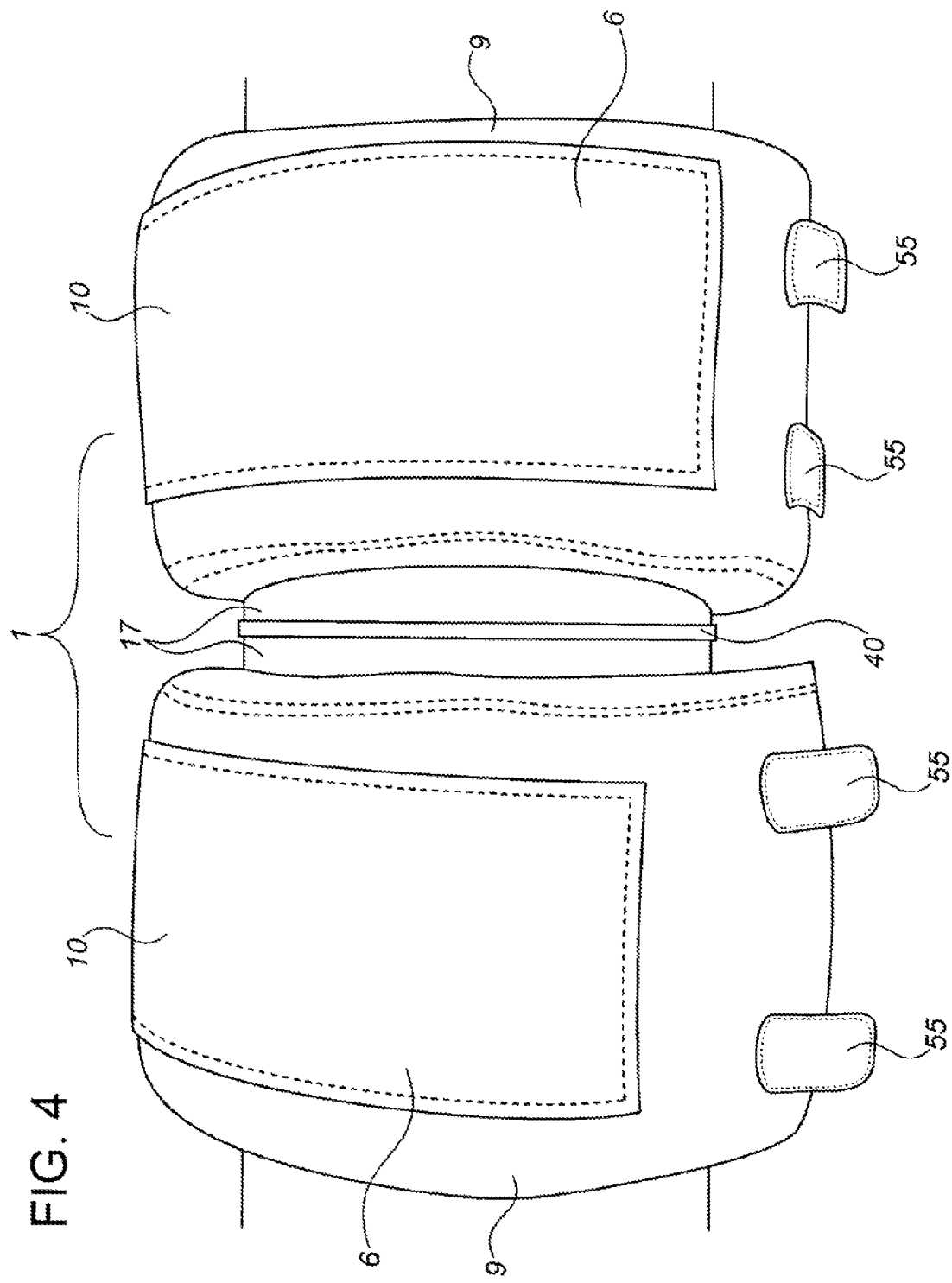
FIG. 4 is a bottom plan view depicting a pair of heating collars secured around a weld joint of a pipe.
Figure 12:
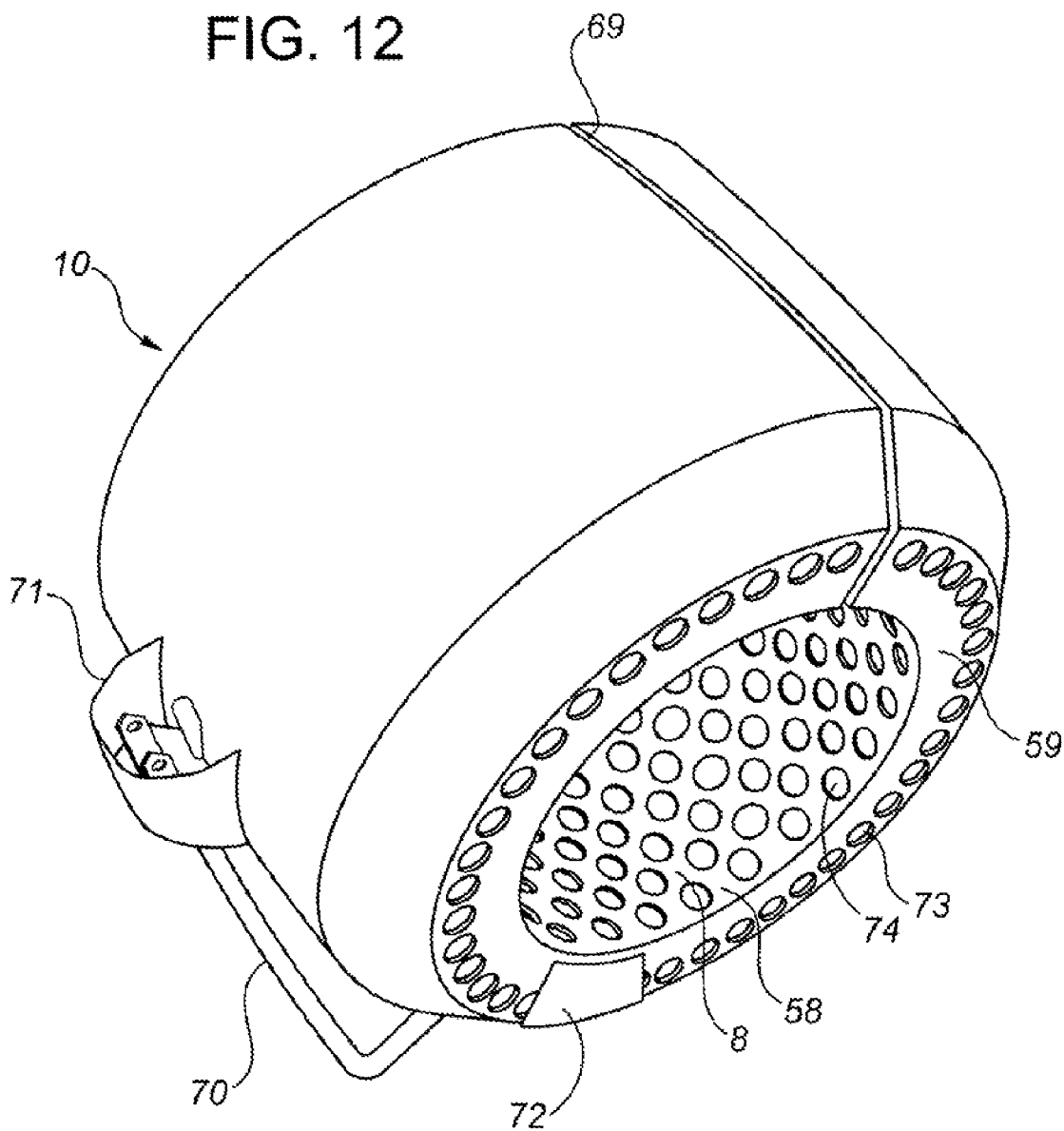
FIG. 12 is a perspective view depicting an alternate embodiment of a heating collar.
Figure 13:
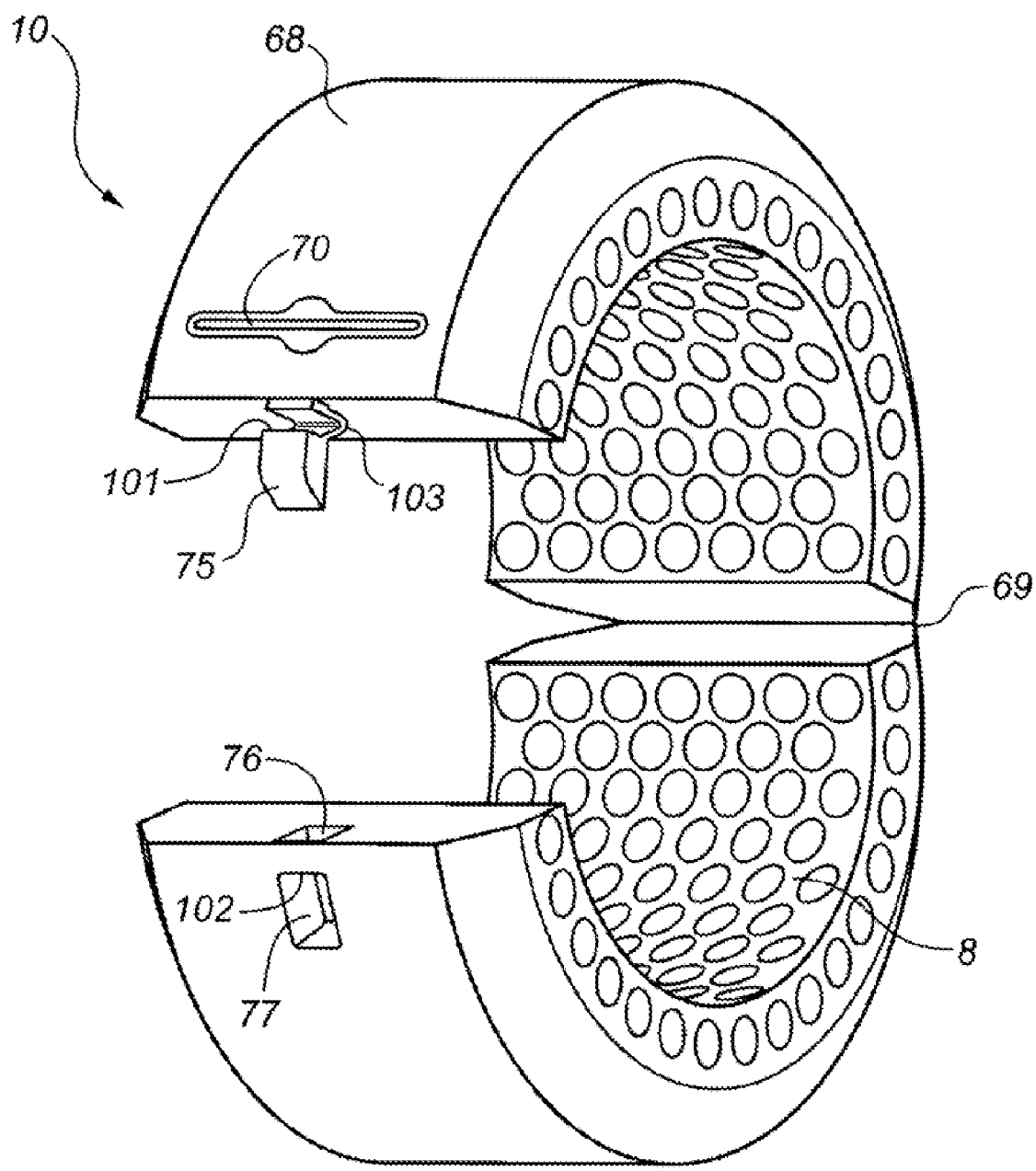
FIG. 13 is a perspective view depicting the heating collar of FIG. 12 in an open position and having a spring-loaded button fastening mechanism.

Exemplary embodiments of a heating apparatus or heating collar are shown in FIGS. 4, 5, 6, 7, 12, and 13. FIG. 4 shows an exemplary heating system 1 configured according to the present invention. As illustrated, this embodiment of the invention includes two heating collars 10 positioned near the end or adjacent to the end of two pipes 17. FIGS. 4-7 show embodiments of the invention in which the outer housing 9 is fabric or the like. FIGS. 12 and 13 show embodiments of the invention in which the outer housing 9 is a molded, more rigid material or the like.

Figure 1:
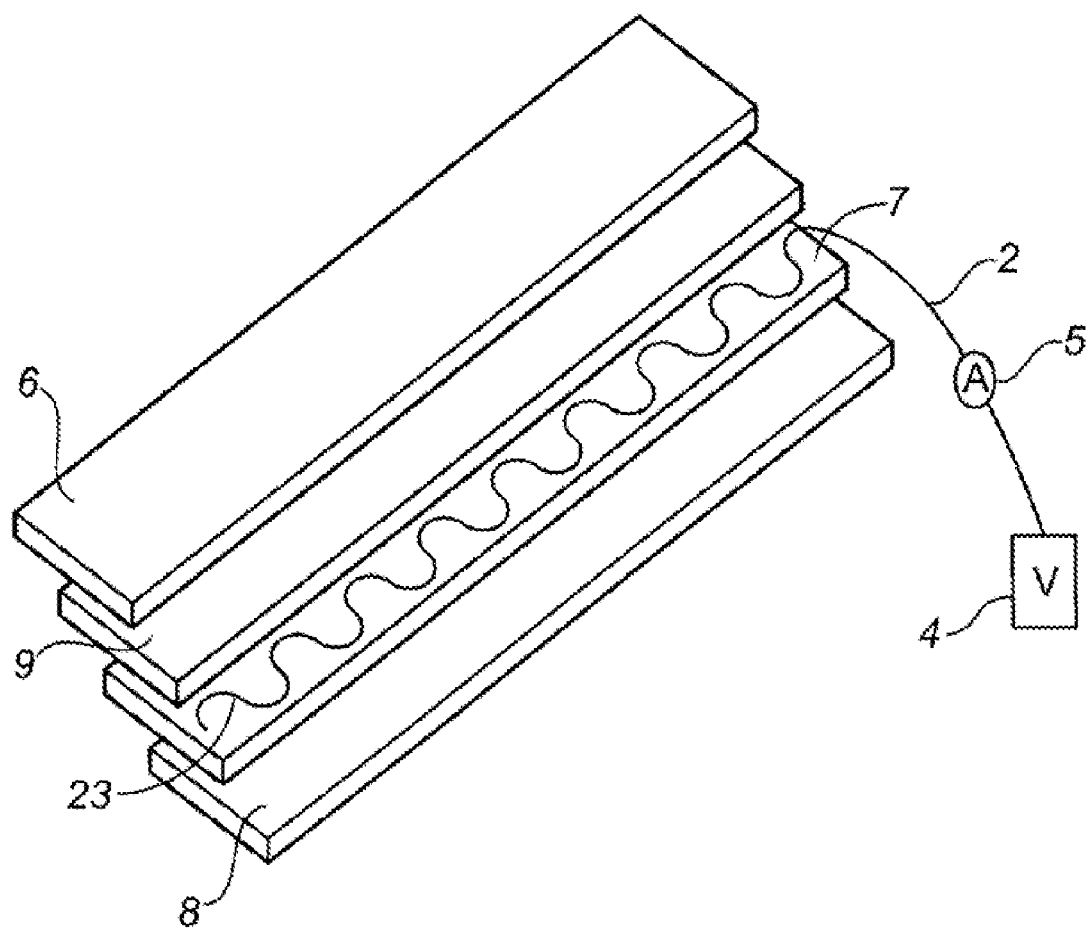
FIG. 1 is an exploded perspective view depicting a general embodiment of a heating apparatus of a heating collar.

As shown in more detail in FIG. 1, the heating apparatus 10 comprises a source of heat 2; a heat modulator 4; a thermally conductive layer 7; an inner layer 8 for transferring heat from said source of heat 2 to a portion of a pipe; an outer or protective layer 9; and, optionally, an outer shell 6.

One skilled in the art will recognize that any source of heat may be incorporated into a system, apparatus, or method of the present invention. Typically the source of heat will be a wire or the like, or a heatable fluid or the like. In preferred embodiments of the invention, the source of heat is a thermally conductive heating element, such as resistive wire heating element 23, an example of which is shown in FIGS. 1 and 2. Wire heating element 23 can provide a mechanism for transferring electrical potential energy into thermal energy.

One skilled in the art will recognize that any heat modulator may be incorporated into a systems apparatus, or method of the present invention. Typically as shown in FIG. 1, the heat modulator may include a thermostatic control mechanism 5 for controlling the voltage and current supplied to heating element 2.

Figure 2A:
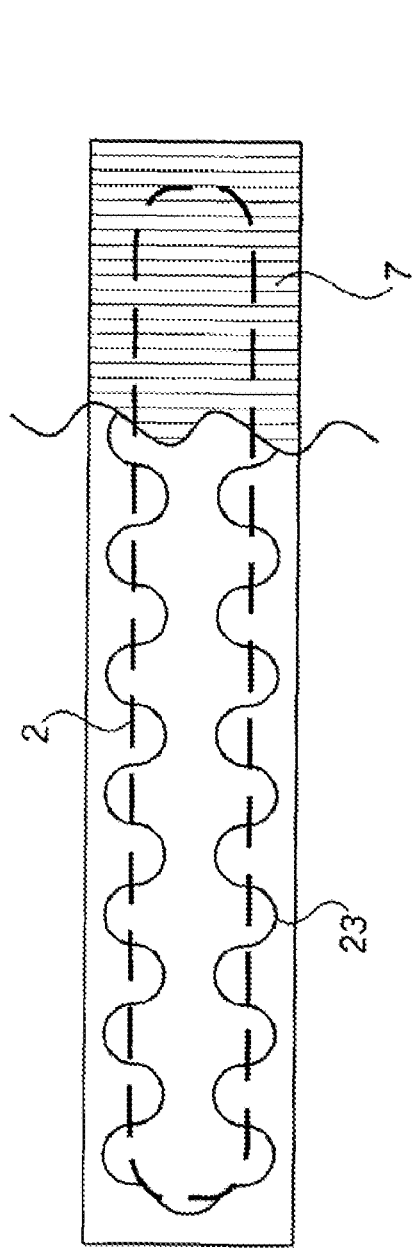
FIG. 2A is a top plan view depicting the inner core of the heating apparatus of FIG. 1.

One skilled in the art will recognize that any heat conductive layer may be incorporated into a system, apparatus, or method of the present invention. The heat conductive layer may be variously configured to position the heating element 2 and the wire heating element 23. Typically, as shown in FIGS. 1 and 2A, the heat conductive layer 7 may be configured or adapted to receive the heating element 2 and/or the coil wire heating element 23. Accordingly, heating element 2 can further comprise thermally conductive core 7 for absorbing, containing, and transferring thermal energy from wire heating element 23 to heat transfer medium 8.

One skilled in the art will recognize that any heat transfer layer, or inner layer, may be incorporated into a system, apparatus, or method of the present invention. In accordance with the present invention the heat transfer layer, such as heat transfer layer 8 in FIGS. 1, 2b, 12, and 13 is positioned so that it directly contacts the pipe and may be formed of any material that readily transfers heat. Heat transfer medium 8 can provide a thermally conductive material for transferring thermal energy from inner core 7. Additionally, heat transfer medium 8 can include opening 36, shown in FIG. 2B, formed on the surface of heating transfer medium 8 for housing thermostatic control mechanism 5.

In one embodiment, heat transfer medium 8 can be made of any material that transfers heat efficiently and easily, typically galvanized sheet metal. The sheet metal can provide an efficient heat transfer substrate and can be formed into the desired shape of the piping.

One skilled in the art will recognize that any protective or outer layer may be incorporated into a system, apparatus, or method of the present invention. A typical protective or outer layer 9 may be contiguous with layer 7, can support heating element 2, and can protect heating element 2 from direct contact with the welding operator. In preferred embodiments of the invention, outer or protective layer 9 is not heat conductive, poorly heat conductive, or may be heat reflective, e.g., directing heat inwardly toward the pipe.

Figure 2B:
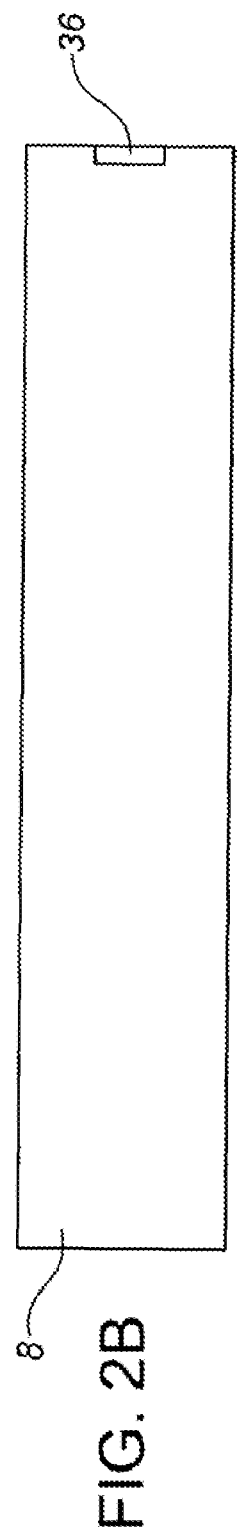
FIG. 2B is a top plan view depicting the heat transfer element of the heating apparatus of FIG. 1.
Figure 2C:
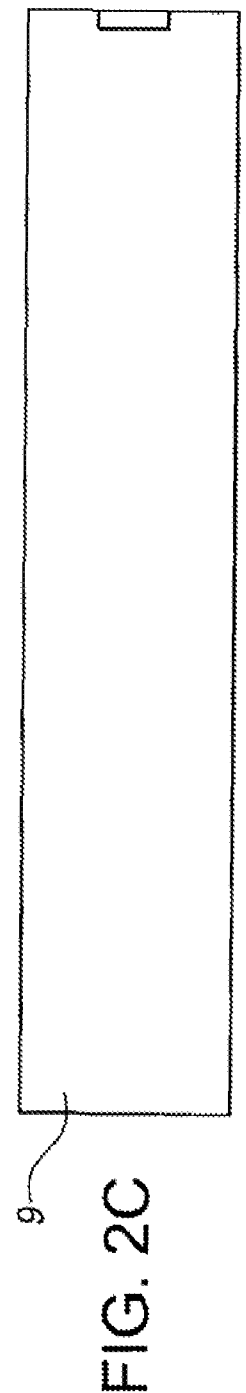
FIG. 2C is a top plan view depicting the outer cover of the heating apparatus of FIG. 1.

As shown in FIGS. 1, 2C, and 4-6, the heating collars of apparatus 10 can further comprise outer cover 9 as shown in FIG. 2C. Outer cover 9 can also provide a protective outer covering for housing heating element 22/23, heat conductive layer 7, and heat transfer layer 8. Outer cover 9 may also provide a safety barrier to help protect the hands of the welding operator from direct contact with any or all of the heating elements. Additionally, outer cover 9 can include housing 46 for holding the wiring (not shown) and thermostatic control mechanism 5 as shown in FIG. 1.

As shown in FIG. 3B, a heating collar of the present invention may further comprise a protective layer 35, preferably formed of a heat insulating substance. In one embodiment, the heating insulating substance can comprise carbo-wool insulation. Carbo-wool insulation is fire retardant and, therefore, does not degrade under high temperature, which can make it suitable as an insulator for the heating collar application.

One skilled in the art will recognize that a shell layer may optionally be incorporated into a system, apparatus, or method of the present invention. A typical shell layer 6 may communicate with or be contiguous with outer layer 9. In preferred embodiments of the invention, shell layer 6 is not heat conductive, and may be a cover or the like for protecting the apparatus operator from direct contact with the source of heat or the heating element.

In accordance with the present invention, shell 6 may be variously configured and adapted to provide protection from the heat source. Shell 6 may be formed of any material that provides protection, including but not limited to fabric or metal, or combinations thereof. Shell 6 may be flexible, rigid, or molded. Outer housing 6 can cover protective layer 9. In another embodiment, outer housing 6 can further comprise a stainless steel cover. The stainless steel cover can provide a protective layer for supporting the internal components of the heating mechanism. In other embodiments, the stainless cover can be flexible.

An exemplary embodiment of an inner layer is shown in FIG. 1 as heat transfer medium or layer 8. In one embodiment heat transfer medium 8 can be contiguous with core 7. Heat transfer medium 8 can absorb thermal energy from core 7 and transfer the thermal energy absorbed from core 7 to the surface of the metal piping when apparatus 10 is wrapped around a pipe to be welded. Heat transfer medium 8 can be a thermally conductive substrate, such as metal, to provide an inner liner for covering and protecting core 7 from damage.

A top view of an inner layer is shown in FIG. 2A. Each collar can comprise an inner core 7. Inner core 7 can be heated by induction by heating element 2. Heating element 2 can comprise coil wire heating element 23. In one embodiment, wire heating element 23 can be a high resistance wire that can provide a heat source to inner core 7 when an electrical current passes through heating element 23.

In accordance with the present invention, the inner core may be formed of any material that conducts or transfer heat. In preferred embodiments of the invention, the inner layer is formed of a ceramic material. Ceramic material can be used for inner core 7 because of the thermal ability of ceramic material to efficiently absorb, retain, and transfer heat directly from the heating element to the weld site. It should be obvious to those skilled in the art, however, that core 20 can be comprised of any suitable material for absorbing, retaining and transferring heat. As required by the pre-welding operation, a method is required for consistently controlling a welding parameter such as temperature.

Ceramic inner core 7 can provide a consistent heat source for the pipe since the flow and transfer of heat from inner core 7 to the pipe can be controlled by thermostatic control mechanism 5 as shown in FIG. 1. For example, inner core 7 can be heated to a specific temperature by controlling the voltage and current applied to wire heating element 23. Conversely, inner core 7 can easily be cooled down to a specific temperature by controlling the voltage and current applied to wire heating element 23.

Figure 5:
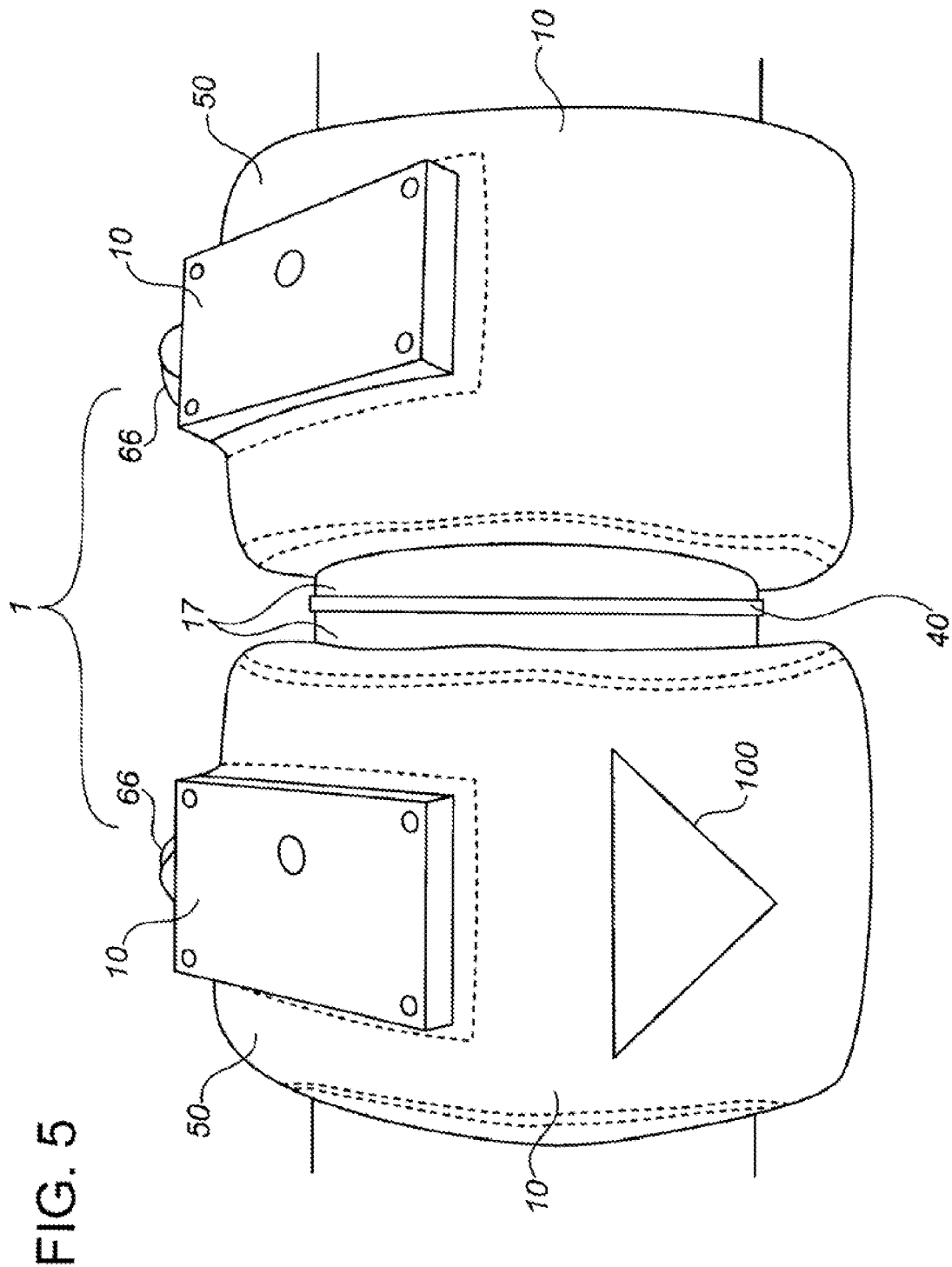
FIG. 5 is a top plan view depicting the heating collars of FIG. 4.

In one embodiment, core 7 can be covered by, enclosed by, or contiguous to one or more layers that are proximal to the core. In these embodiments of the invention, the proximal layers preferably promote heat transfer from the heating element to the pipe or weld. In these embodiments of the invention, core 7 may also be covered by, enclosed by, or contiguous to one or more layers that are distal to the core. In these embodiments of the invention, the proximal layers preferably promote lower or no heat conductivity. These proximal layers may also protect the operator from the heat generated by the heating element or from the heating element itself. In one embodiment, heating apparatus 10 is shown in FIGS. 4 and 5 as comprising a pair of opposed heating collars 10. Collars 10 can be placed on either side of the weld joint 17 for preparing the weld joint 40 for a given section of pipe before performing the required pre-weld heating operation.

Referring to FIGS. 3A and 3B, a cross-sectional view of a portion of the heating collar is shown. In this embodiment, inner core 7 can be spaced substantially parallel and contiguous between transfer medium 8 and outer cover 9. Additionally, to protect the hands of the welding operator from direct contact with the heating element, protective layer 35 can be provided on top of outer cover 40.

In accordance with the present invention, the system, apparatus, and/or method may include one or more fasteners for positioning the collar on the pipe. One skilled in the art will recognize that the fastener may comprise any number, variety, configurations, and combinations in order to attach the collar to the pipe. Fastener 55 can provide a mechanism for securing the collar around the piping. FIGS. 3B and 4 illustrate exemplary embodiments, e.g., wherein outer housing 9 can terminate in at least one fastener 55. In one embodiment, fastener 55 can comprise a releasable connector assembly, such as Velcro™, that extends beyond first end 43 of outer housing 9. Fastener 55 can further comprise second end 47 on outer housing 9. Second end 47 can attach to a portion of first end 43 thereby securing the heating collar around the piping.

In one embodiment, the collar can be releasably secured around a pipe, typically using straps, and/or D-rings, and/or latches, and/or catches, a spring-loaded button that latches with a receptacle, a thumb-catch, or a briefcase-style latch, or the like. In yet another embodiment, the collar can be closed using a lynch pin passing through loops disposed on both upper and lower portions of the collar.

It will be apparent to one skilled in the art that the scale and proportions of each heating collar can be adjusted to accommodate various dimensions of piping. For example, the length (x) of the collar can be adjusted to accommodate various diameters of piping. Additionally, the width (y) of the collar can be adjusted to provide a greater heating surface area on the piping.

It will be obvious to those skilled in the art that any geometry for fastening means 55 can be used. For example, the length of first end 43 can be adjusted to secure around various dimensions of piping. Additionally, second end 47 can also be adjusted to accommodate the modulated dimension of the first end. For example, a longer Velcro tab for first end 43 can be provided to accommodate larger dimensions of piping. Also, a greater Velcro fastening area for second end 47 can be provided to accommodate first end 43. In this way, the heating collar can be adjustable to accommodate a wide range of piping diameters.

Referring to FIG. 5, guide 100 is shown for aligning the heating apparatus on the piping. In one embodiment, each heating collar can be aligned on the piping so that the guide, shown here in its exemplary configuration as an arrow, is pointing toward the ground. This orientation can assist the welding operator with the application of the collars, and with the assembly of the heating apparatus on the piping. Additionally, by keeping the weight of the collar on top of the piping, fastening means 55 can provide an improved fit on the piping.

Figure 7:
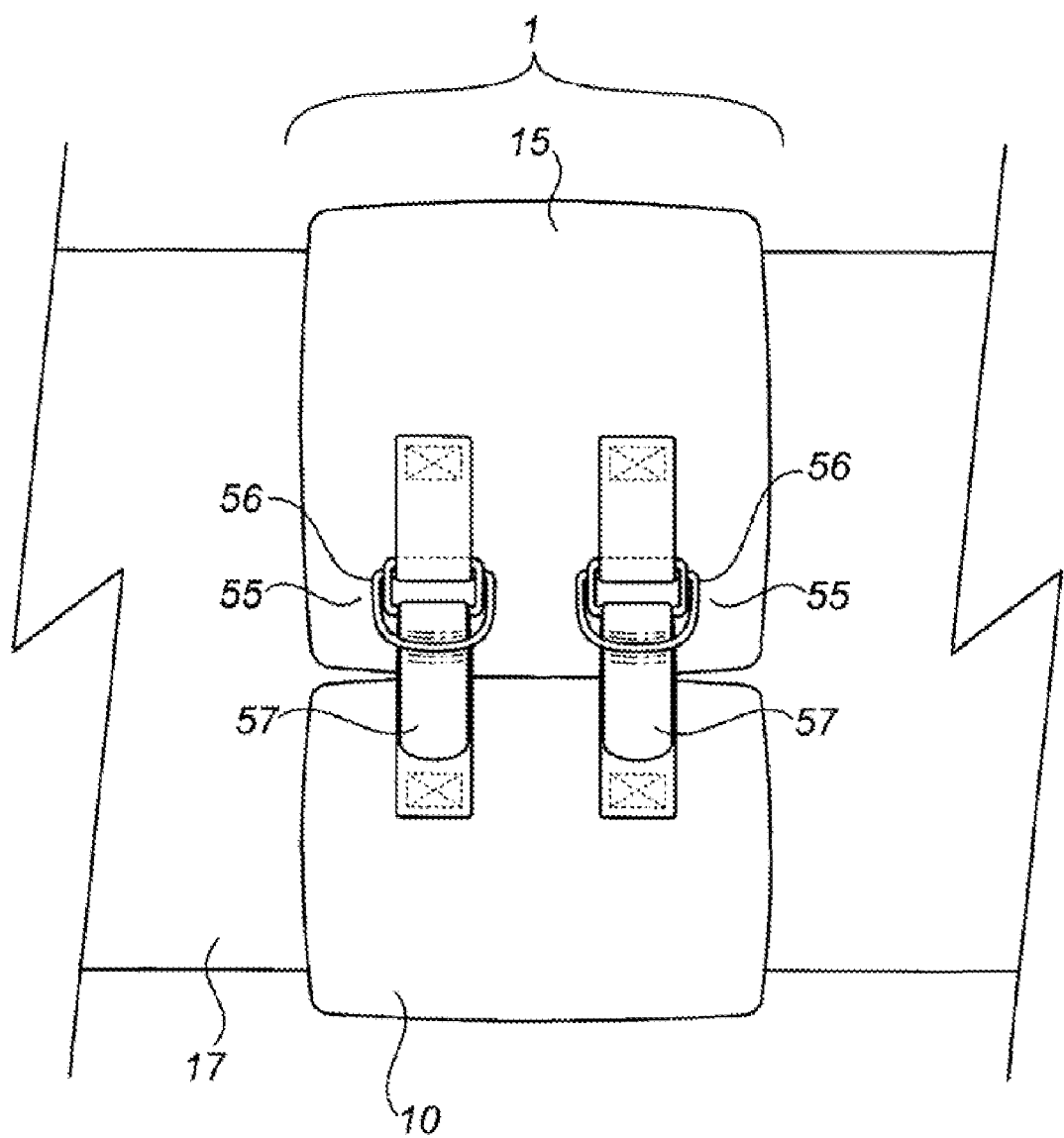
FIG. 7 is a side elevational view depicting the fastening straps on the heating collar of FIG. 4.

Referring the FIG. 7, an embodiment of collar 10 is shown wherein a fastener 55 can comprise D-rings 56 as well known to those skilled in the art. To fasten collar 15 to pipe 17, straps 57 can be looped through D-rings 56 and pulled taught.

Figure 8:
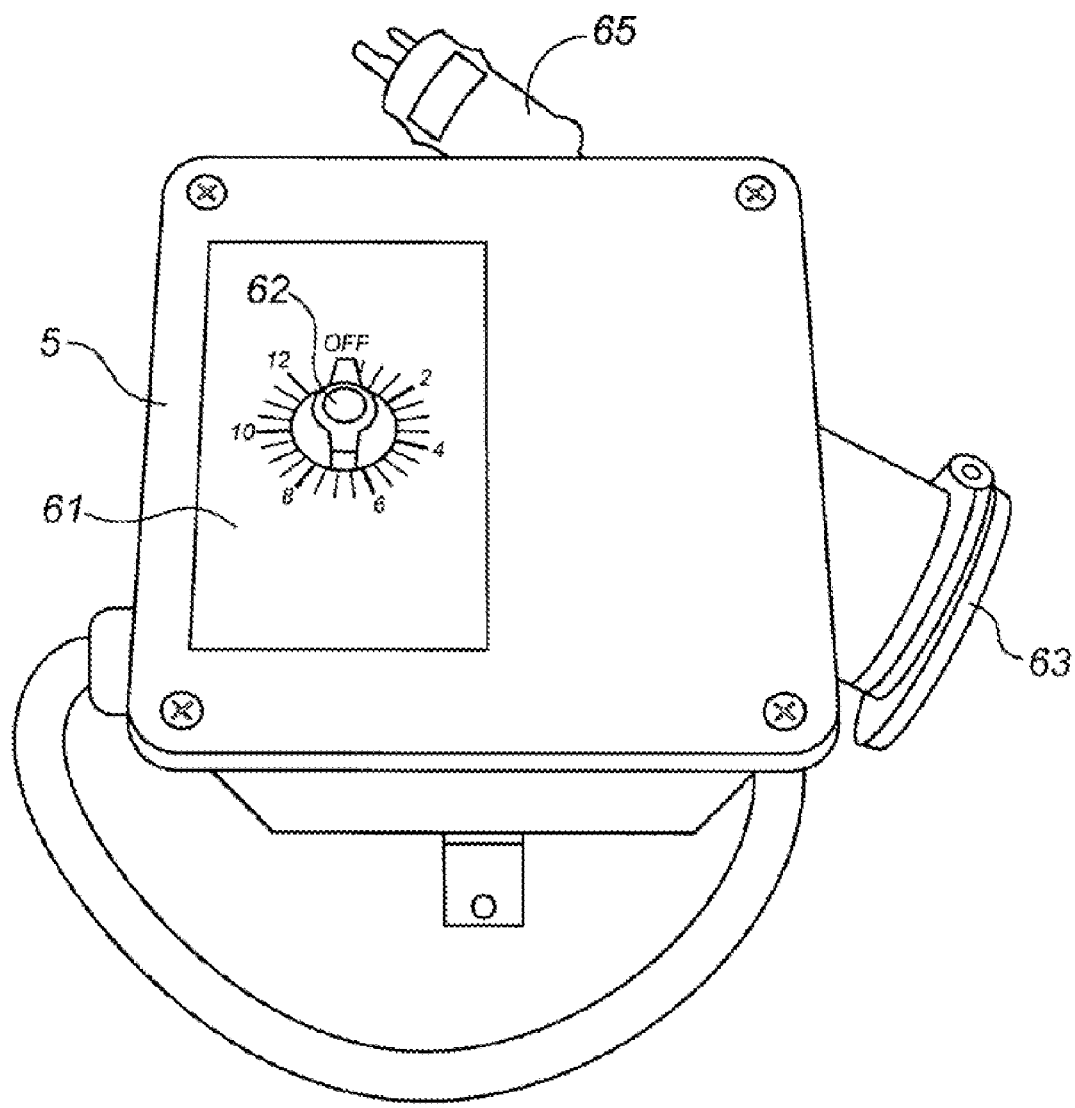
FIG. 8 is a top perspective view depicting a thermostatic control mechanism for the heating apparatus of FIG. 1.

Referring to FIG. 8, a representative embodiment of thermostatic control mechanism 5 is shown. Thermostatic control mechanism 5 can provide a thermostatic control device for controlling the temperature of each collar. As well known to those skilled in the art, a thermostatic control device can comprise means to sense temperature (not shown) whereby the control device can interrupt or close an electrical circuit once a pre-set temperature or threshold has been reached.

In the embodiment illustrated in FIG. 8, thermostatic control mechanism 5 can comprise throttle mechanism 61 for controlling the voltage applied to wire heating element 23 (FIG. 2A). In another embodiment, throttle mechanism 61 can comprise dial 62 that allows the user to select a range of temperature settings for each heating collar. Thermostatic control mechanism 5 can further comprise voltage input plug 65. Voltage input plug 65 can comprise a male plug for connecting to a voltage source, such as 110 Volts AC (not shown). Thermostatic control mechanism 5 can further comprise voltage output socket 63. Voltage output socket 63 can comprise a male plug that is connected with second input socket 66 located on and connected directly to the heating element of the heating collar via cable 67 (shown in FIG. 6). In this illustrated embodiment, thermostatic control mechanism 5 can be temporarily attached to the pipe being welded using any suitable attachment means as well known to those skilled in the art, whereby the temperature sensing means senses the temperature in the pipe being heated. Once the desired temperature has been reached, thermostatic control mechanism 5 can stop applying voltage to wire heating element 23. In another embodiment, thermostatic control mechanism 5 can be integral to each heating collar and disposed in openings 36 and 46 shown in FIGS. 2B and 2C, respectively, and as described above.

Figure 9:
FIG. 9 is an electrical schematic depicting the electrical circuitry of an embodiment of a heating collar.

Referring to FIG. 9, an electrical schematic is shown that represents the electrical circuitry of an embodiment of the apparatus described herein. Heating coils 84a and 84b represent the wire heating elements (element 23 in FIG. 1) disposed within the heating collars and are connected to connector terminals 82 and 83. Power line neutral 90 from an electrical power source (not shown) is coupled to terminal 82. Terminals 83 are coupled to terminal 86 on thermostat 80. Power line 88 from the electrical power source is coupled to terminal 87 on thermostat 80.

Figure 10:
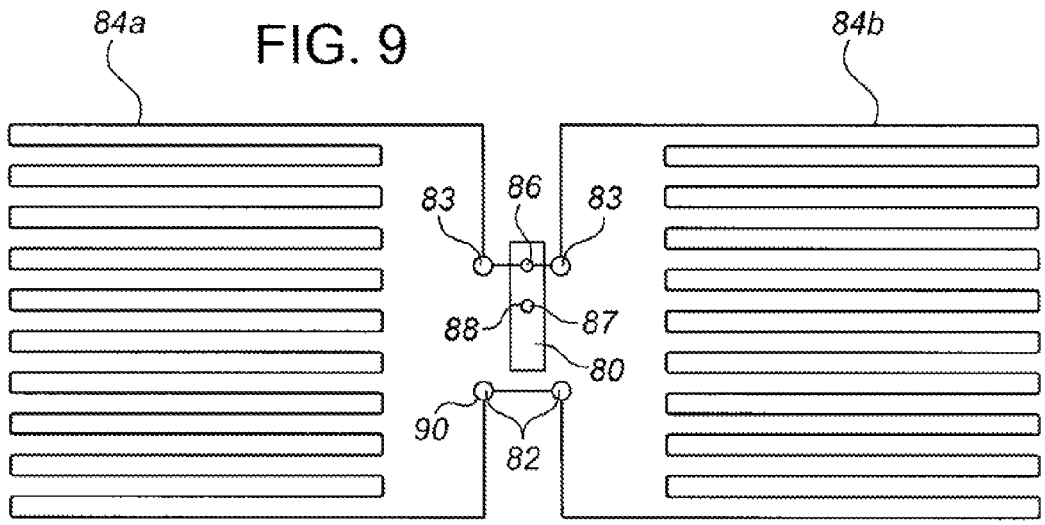
FIG. 10 is a perspective view depicting the heating coils of a heating collar of FIG. 4.
Figure 11:
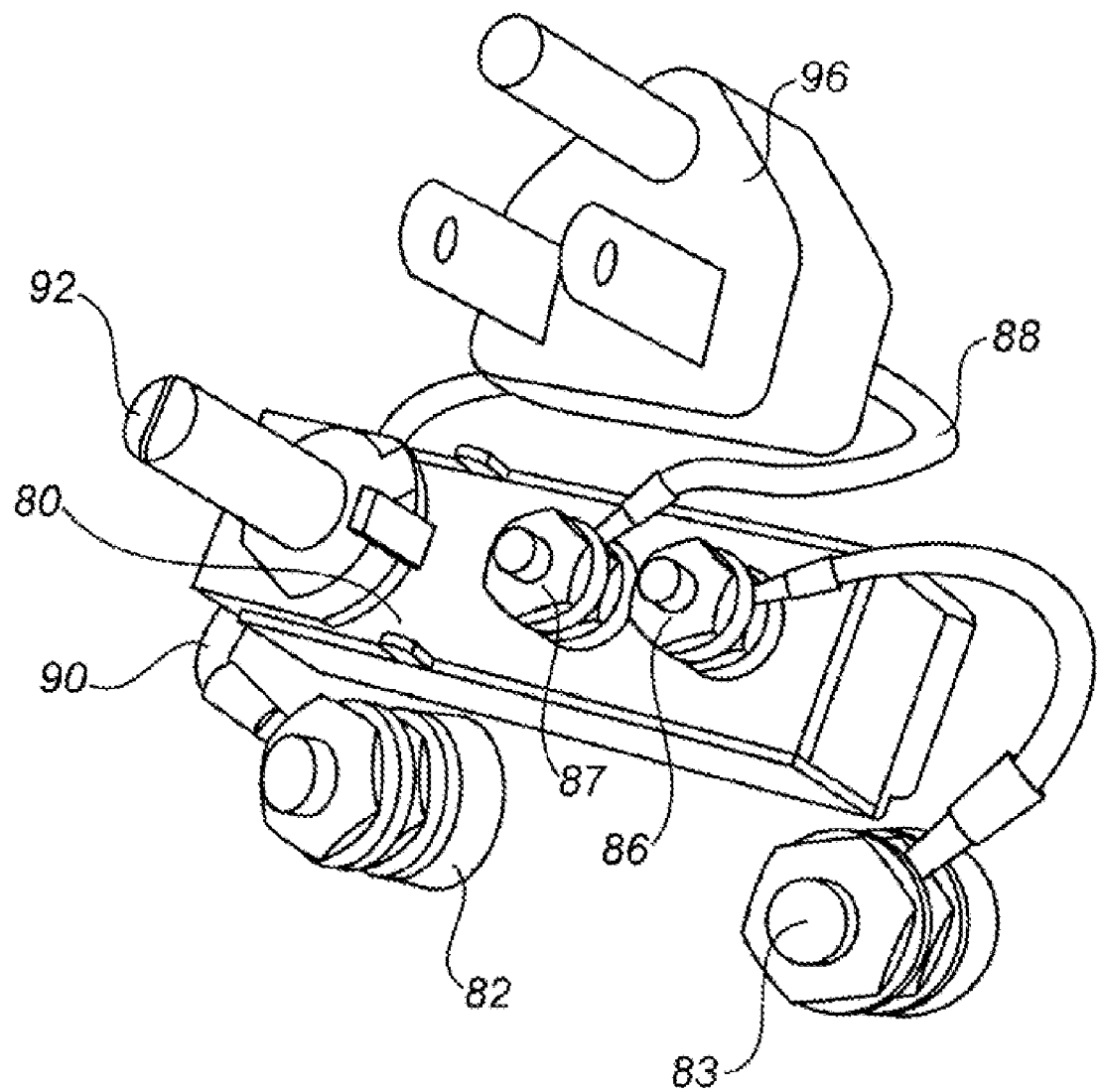
FIG. 11 is a perspective view depicting the thermostat of the heating coil of FIG. 10.

In the illustrated embodiment shown in FIGS. 10 and 11 heating coils 84a and 84b can be connected to connector terminals 82 and 83. Connectors 82 can couple to power neutral line 90. Connectors 83 can couple to terminal 86 on thermostat 80. Power line 88 can couple to terminal 87 on thermostat 80. In this embodiment, thermostat 80 can be configured to be disposed within the heating collar in opening 36 as shown in FIG. 2B and as described above. Power line 88 and neutral line 90 can be enclosed in cable 94 that can include power plug 96 located at a far end of cable 94 for plugging into an electrical power outlet (not shown). Thermostat control 92, as shown in this embodiment, is a rotary control that is used to set the desired temperature the heating collars are to heat a pipe to. It should be obvious to those skilled in the art that thermostat control 92 can be of any suitable type of control as used on thermostats.

In operation, thermostat 80 can close an internal electrical connection between terminals 86 and 87 (not shown) to allow electrical current to flow through heating coils 84a and 84b. As the heating coils heat the pipe, thermostat 80 can sense the temperature of the pipe. When the temperature of the pipe is approximately that of the preset temperature setting on thermostat control 92, thermostat 80 opens the electrical connection between terminals 86 and 87 to stop the flow of current through heating coils 84a and 84b thereby stopping the heating of the pipe beyond the preset temperature setting on thermostat control 92. As the pipe cools below the preset temperature, thermostat 80 can close the electrical connection between terminals 86 and 87 to commence heating of the pipe. As well known to those skilled in the art this heating and cooling cycle can be repeated until electrical power is disconnected from the heating coils or until thermostat control 92 is adjusted to a new temperature setting whereby the heating and cooling cycle can adjust to the new temperature setting.

Figure 6:
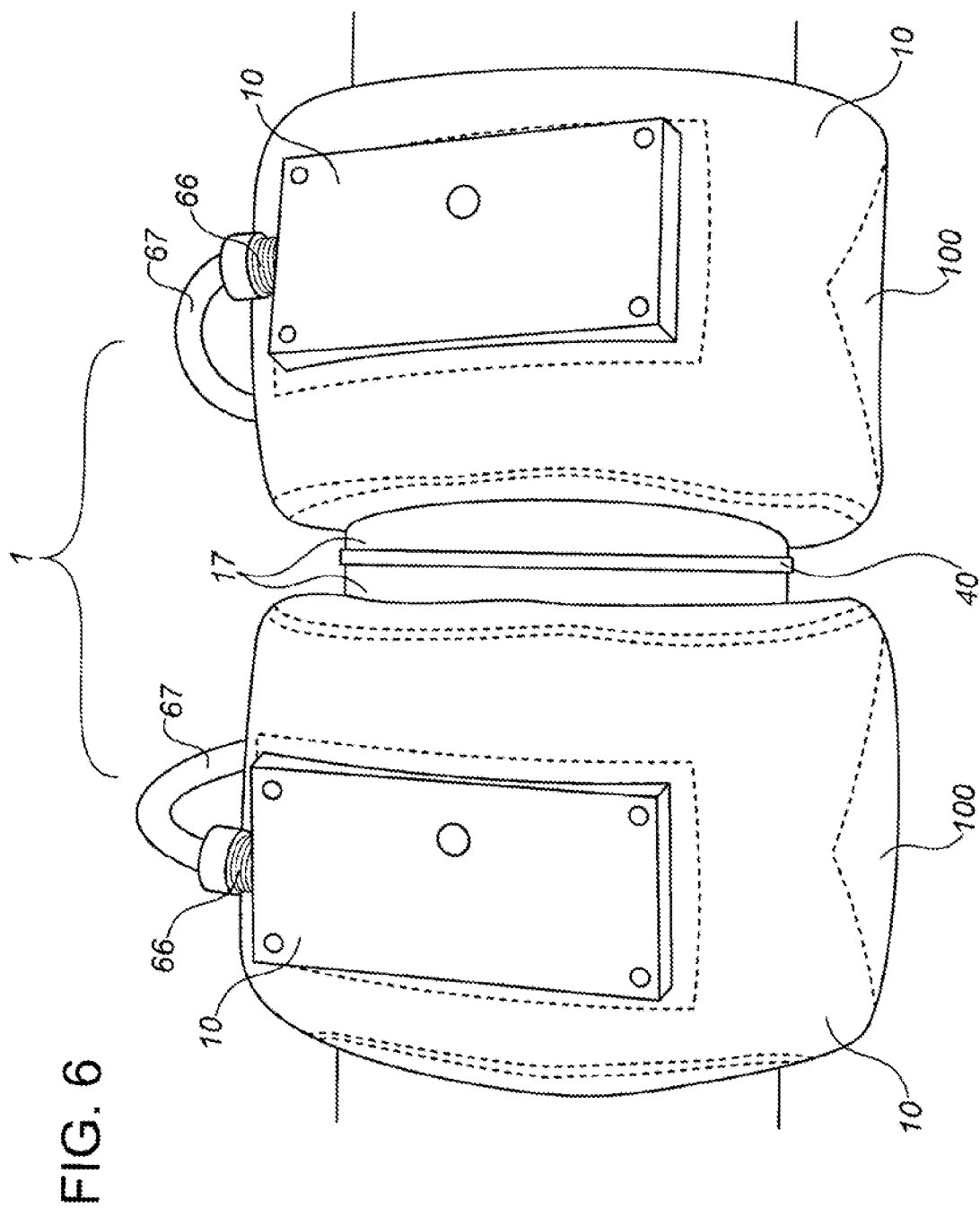
FIG. 6 is a side elevational view depicting the heating collars of FIG. 4.

Referring to FIG. 6, the illustrated heating collar can comprise dedicated female input socket 66. In this embodiment, a single thermostatic control mechanism 5 is required for each collar. This configuration allows the welding operator to individually select the pre-heating temperature for each collar of either side of the welding joint. It will be apparent to one skilled in the art that such a configuration allows the welding operator many degrees of freedom to control the welding parameter of temperature since each individual collar can be pre-set to a different temperature based on the application. However, it will also be apparent to one skilled in the art that other configurations can be used for connecting the power source to each collar. For example, the collars can be connected in series such that a single input socket 66 can be located on one of the adjacent collars. Each collar can be connected in series to the collar having the input socket 66.

It is also contemplated that any type of thermostatic control device that can control the voltage and current applied to wire heating element 23 could be used. As mentioned previously, wire heating element 23 can provide resistance "R" through the wire to serve as the heating element. In one embodiment, the voltage "V" applied to wire heating element 23 can be a nominal 110 Volts AC. The resistance "R" of the wire can be chosen to match the thermal conductivity "C" that is required to create the desired temperature in the wire.

Typically, the temperature "T" required for the heating element is one that can drive the piping to the desired pre-welding temperature required to perform the desired operation. Thermostatic control mechanism 5 can be used to adjust the required pre-welding parameter of temperature. Thermostatic control mechanism 5 can allow the welding operator to adjust the temperature of each heating collar depending upon the thickness, diameter, and material of the piping.

FIG. 12 shows several additional elements that may be incorporated into a heating apparatus and system of the present invention. Heating collar 10 is shown in a closed position. In this embodiment, heating collar 10 has a hard shell outer covering 6 and can be comprised of two portions or approximate halves joined together by hinge 69. This configuration allows collar 10 to be opened and placed onto a pipe, and then closed around the pipe. A heating collar of the present invention may further comprise handle 70 disposed thereon. Handle 70 can be grasped by an operator to open and close collar 68. A heating collar may also include an input voltage plug 71 disposed on the outer surface of collar. Also, clasp 72 disposed on collar 10 can be used to secure the collar halves together after collar 10 has been placed on a pipe. Also, ventilation holes 73 on inside surface 58 can allow heat from heating element 23 to dissipate from the collar to the pipe. Ventilation holes 73 can also be disposed on sidewall 59 to allow air to circulate through the collar.

Referring to FIG. 13, collar 10 is shown in an open position. In this embodiment, collar 10 can have a fastening mechanism that can include spring-loaded button 75 disposed on an upper half of collar 10 via spring 103. Collar 10 can also include opening 76 disposed on a lower half of collar 10. When collar 10 is closed around a pipe, button 75 can be inserted into opening 76 until button 75 is fully seated in opening 77 whereby edge 101 of button 75 catches edge 102 of opening 77 to secure the collar halves together. The spring tension of spring 103 can keep button 75 seated in opening 77. To open collar 10, button 75 can be depressed so that edge 101 clears edge 102 thereby allowing button 75 to be pulled from opening 76 as collar 10 is opened.

Figure 14:
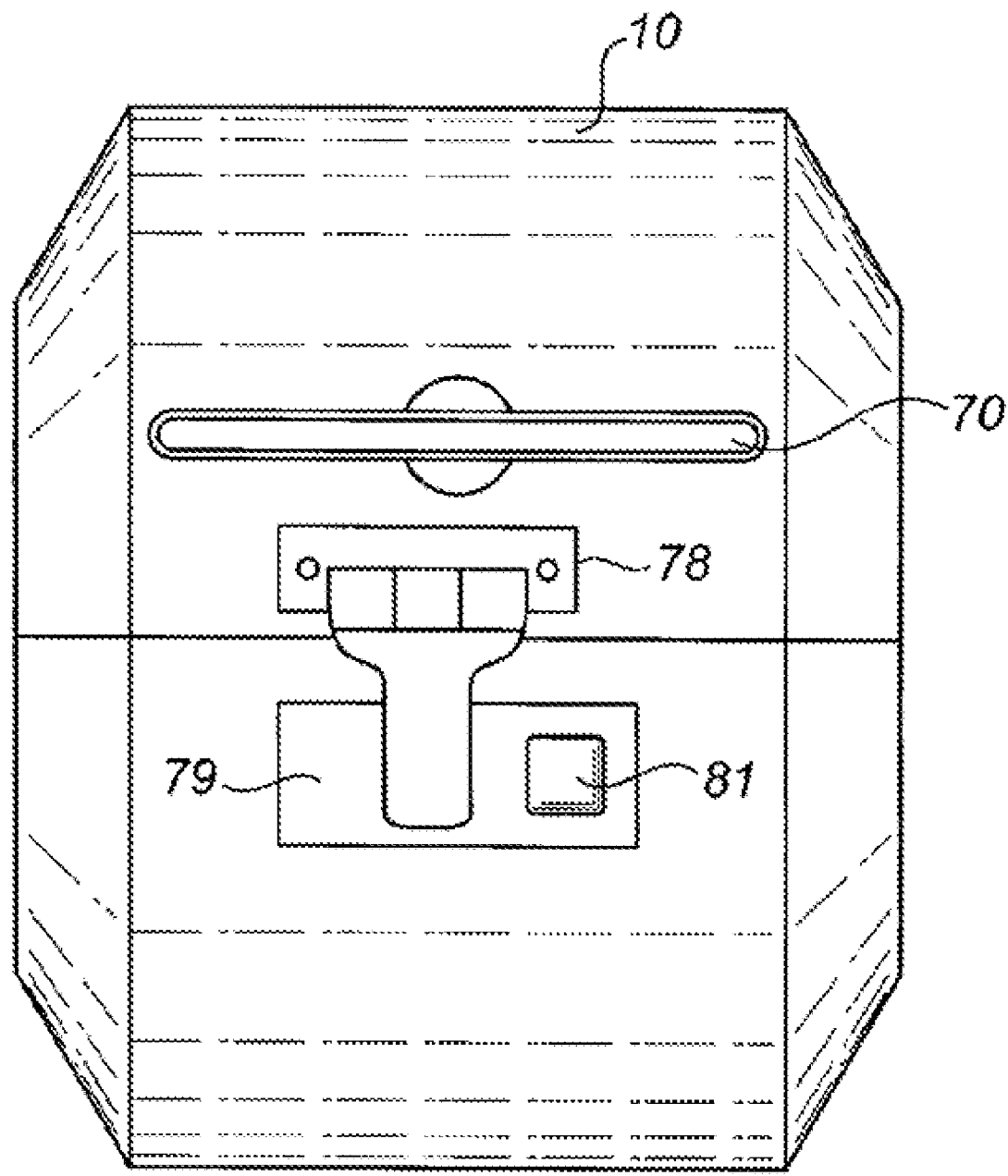
FIG. 14 is a front elevation view depicting the heating collar of FIG. 12 in a closed position and having a thumb-catch fastening mechanism.

Referring to FIG. 14, collar 10 is shown having an alternate fastening mechanism. In this embodiment, collar 10 can have a "briefcase-style latch" or "thumbcatch" comprising of spring-loaded latch clasp 78 and catch 79. To secure the halves of collar 10 together, clasp 78 can be inserted into and latched to catch 79. To open collar 10, release button 81 can be pushed in or pushed to one side to release clasp 78 from catch 79.

Referring to FIGS. 15A to 15C, collar 10 is shown having a further alternative fastening mechanism. FIG. 15A shows pin loops 49 and 51 disposed on the upper and lower collar halves, respectively, and lynch pin 48. In FIG. 15A, collar 10 is shown in an open position. In FIG. 15B, collar 10 is shown in a closed position with loop 49 disposed between loops 51 and lynch pin 48 inserted through loops 49 and 51 to secure the collar halves together. In FIG. 15C, spring-loaded ring 53 is shown closed against lynch pin 48 to keep lynch pin 48 from sliding out of loops 49 and 51. In a further embodiment, lynch pin 48 can be attached to collar 10 with line 52 having one end attached to collar 10 and the other end attached to ring 53. Line 52 can be a monofilament or stranded string or cable of suitable material as obvious to a person skilled in the art.

DEFINITIONS

For the purposes of this specification, the terms set out below are defined as follows.

The term "pre-weld heating" refers to the operation of preheating a section of pipe to the desired temperature before performing a welding operation upon a section of pipe. For example, in a pre-weld heating operation using P91 chromemoly steel pipe, the pipe is heated to a temperature range between 200-550 degrees Fahrenheit. The term "P91" is used to describe a common type of pipe used in a high-pressure application for transporting oil, gas, or steam. P91 is comprised of a chromium-molybdenum alloy having the chemical composition of 9Cr-1Mo—V (P91).

The term "hydrogen bake-out" refers to a finishing operation on a weld whereby a welded section of pipe in-situ is held at a constant temperature in order to remove any hydrogen impurities from the weld in preparation for a cutting or welding operation. A hydrogen bake-out helps prevent the weld-joint from pre-mature fracturing of the weld-joint or pipe in-situ.

The term "interpass temperature" refers to the temperature of the pipe between welding passes. A "welding pass" is the path taken by a single welding operation. For example, a welding pass for a section of pipe is the circumferential path taken around a weld joint for the pipe.

As used herein, the term "contiguous" refers to the relative position of an element or layer, and typically is used to mean that core 7, transfer medium 8, and shell 9 can be in contact with an adjacent layer. The greater the surface area of core 7 that is in contact with the surface area of transfer medium 8, the greater the thermal energy transfer that can occur between core 7 and transfer medium 8.

It should be apparent to one skilled in the art that core 7, transfer medium 8 and shell 9 can be of any suitable physical configuration so long as core 7 is sandwiched between transfer medium 8 and shell 9 with no gaps therebetween in order to enable the efficient heating functionality of apparatus 10.

For the purposes of this specification the term "distal end" refers to first end 43 on heating collar 10. Similarly, the term "proximal end" refers to second end 47 on heating collar 10. In one embodiment, the distal end and the proximal end of each collar are located at each of the opposed ends of the collar. However, it is contemplated that first end 43 and second end 47 of fastening means 55 can be located anywhere along the length of heating collar 10.

Although a few illustrative embodiments have been shown and described, those skilled in the art will appreciate that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the scope of the invention is defined and limited only by the claims that follow.

I claim:

1. A heating apparatus for heating a section of metal piping comprising:

at least one opposed heating collars spaced substantially parallel and contiguous with a weld joint, each heating collar comprising a resistance wire network which is capable of creating a thermal resistance through the network when voltage is applied across the wire, an inner core which is contiguous with the piping and absorbs the thermal heat energy from the network and transfers it to the piping, each heating collar further comprising a protective layer, said protective layer providing a protective outer covering for supporting and protecting said heating collar from the external environment, said protective layer further comprising a fastener for securing each collar securely around the piping; and a control mechanism for controlling the voltage applied across the network, wherein the control mechanism controls the voltage and modulates the voltage applied across the network thereby controlling the quantity of thermal energy transferred between the inner core and the metal piping.

2. The heating apparatus as set forth in claim 1 wherein each heating collar is further comprised of an inner layer for absorbing thermal energy from the network, said inner core transfers thermal energy to the piping.

3. The heating apparatus as set forth in claim 2 wherein each heating collar is further comprised of a heat transfer element, said heat transfer element is contiguous with the inner core and transfers thermal energy between the inner core and the piping.

4. The heating apparatus as set forth in claim 3 wherein each heating collar is further comprised of an outer cover, said outer cover providing a thermally conductive heat transfer substrate for transferring thermal energy from the inner core to the piping.

5. The heating apparatus as set forth in claim 4 wherein each heating collar is further comprised of an insulating layer, said insulating layer provides a heat insulating layer for protecting the hands of the welding operator from direct thermal contact with the heat transfer element.

6. The heating apparatus as set forth in claim 1 wherein the control mechanism is further comprised of a voltage input plug.

7. The heating apparatus as set forth in claim 6 wherein the voltage input plug receives voltage from a power source of 110 volts.

8. The heating apparatus as set forth in claim 1 wherein the fastener is comprised of both a first end and a second end on the protective layer.

9. The heating apparatus as set forth in claim 8 wherein the first end is comprised of a releasable tab secured to a distal end of the protective layer, and a second end secured to a proximal end of the protective layer, said second end is comprised of a Velcro receiving end for receiving the Velcro tab of the distal end for fastening the heating apparatus around the circumference of the piping.

10. The heating apparatus as set forth in claim 8 wherein the fastening means further comprises D-rings and straps.

11. The heating apparatus as set forth in claim 1 wherein the protective outer covering further comprises a hard shell.

12. The heating apparatus as set forth in claim 11 where the hard shell further comprises two portions or halves hinged together.

13. The heating apparatus as set forth in claim 12 wherein the fastening means further comprises a spring-loaded button disposed on one portion or half and an opening for the button disposed on the other portion or half.

14. The heating apparatus as set forth in claim 12 wherein the fastening means further comprises a thumb catch disposed on the hard shell portions or halves.

15. The heating apparatus as set forth in claim 12 wherein the fastening means further comprises a lynch pin and pin loops disposed on the hard shell portions or halves.

16. The heating apparatus as set forth in claim 1 wherein the control mechanism further comprises a thermostatic control mechanism.

* * * * *